Patented Sept. 20, 1927.

1,642,965

UNITED STATES PATENT OFFICE.

PAUL J. McCULLOUGH, OF ST. LOUIS, MISSOURI, ASSIGNOR TO SCULLIN STEEL CO., OF ST. LOUIS, MISSOURI, A CORPORATION OF DELAWARE.

SIDE FRAME.

Application filed February 14, 1927. Serial No. 168,043.

My invention relates to an improved side frame and roller bearing retainer case cast integral with said side frame, and it is particularly applicable to roller or ball bearings used in journals of the trucks of railroad freight and passenger cars, and particularly in the roller or ball bearing wheeled truck side frame and the bearing retainer connected therewith. Heretofore in all journals of the trucks of freight and passenger cars a brass bearing has been used, and is now being employed, which carries the load when the cars are in motion and are not of the roller or ball bearing type. By my invention much more efficiency and durability in length of service of trucks can be obtained. As is well known, any mechanical device employing the roller or ball bearing feature is much more dependable for severe and long continued use than one without. Under proper care and maintenance roller or ball bearings will endure wear and tear of the appliance to which they are attached, or combined with, to a much greater proportion than one without, thus materially lengthening the life thereof.

Fig. I is a cross-sectional view of the side frame and the roller bearing constructed in accordance with my invention.

Fig. II is a side elevation of my improved device.

In the drawing, 1 designates a side frame which has cast integral therewith a bearing ring retainer case 2. 3 designates a bearing ring retainer which is adapted to encircle the roller or ball bearing and axle, all of which I have designated by the letter A. 4 designates a covercap, or dustcap, adapted to be fitted over the outer end of the journal to prevent the entry of grit and dust into the bearing. This dustcap 4 is maintained in place by an expanding snap ring 5 which fits about the out-turned outer edge of the dustcap 4, said ring 5 fitting into a recess 6 provided in the bearing ring retainer 3. 5' is a similar expanding snap ring located on the inner side of the bearing ring retainer 3 and also adapted to seat in a recess 6' in said retainer 3. 7 designates an L-shaped oil retainer adapted to be located on the inside portion of the roller bearing A and is retained in place by the expanding snap ring 5' and a portion of the roller journal bearing A, which I have designated by the numeral 8.

Particular attention is directed to the concave and convex faces 9 of the bearing ring retainer case 2 and the bearing retainer 3. These faces are in the zone of a relatively perfect sphere taken transversely of the bearing. By this arrangement these faces are adapted to slide upon each other in such distance as may be required under operating conditions where the car equipped with my improved device is in railway service. Not much motion between these faces is required, but any shifting of the position of these faces permits the side frame 1 to absorb any shocks transmitted through the journal to the side frame in a line in which said side frame is best adapted to receive such shocks and to relieve the journal of any undue strain occasioned by such shocks.

It will be noted in the lower portion of Fig. I that a part of the bearing ring retainer 3 is reduced transversely so as to form the portion which I have designated by the numeral 10. The concave and convex faces 9 on this lower portion are formed in the zone of a relatively perfect sphere the same as the faces 9 near the top of Fig. I. The purpose of this reduced portion 10 and the reduced bearing ring retainer 2 at the bottom of the structure is to provide means for detaching the journal and bearing ring retainer 3 from the side frame 1. When the journal is tilted so that the lower portion moves to the right or left a sufficient distance to disengage the portion 10 from the lower face of the bearing ring retainer case 2, the journal is permitted to drop down and, by further tilting, the upper face will pass beneath the lower portion of the bearing ring retainer case 2, when the axle and journal may be freely removed from said frame 1.

In order to prevent rotation of the bearing ring retainer 3 with respect to the bearing ring retainer case 2 I have provided a key 11 in the lower part of the bearing ring retainer case 2 which is adapted to fit into a slot adapted to receive said key in the bearing ring retainer 3. By this construction the bearing ring retainer 3 may move transversely of the bearing ring retainer case 2, but is prevented from rotative movement with respect thereto.

Sept. 20, 1927.　　　P. J. McCULLOUGH　　　1,642,965
SIDE FRAME
Filed Feb. 14, 1927
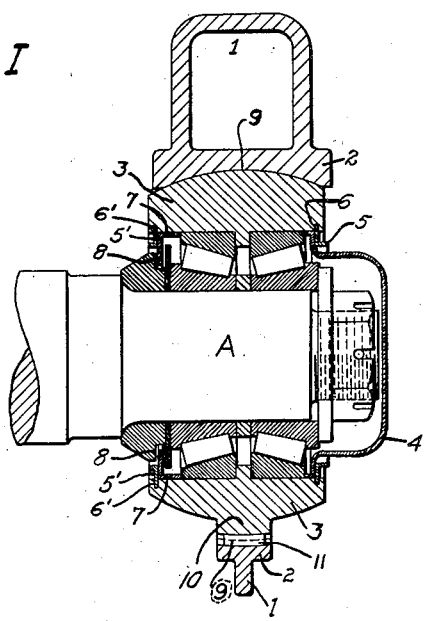
Fig. I
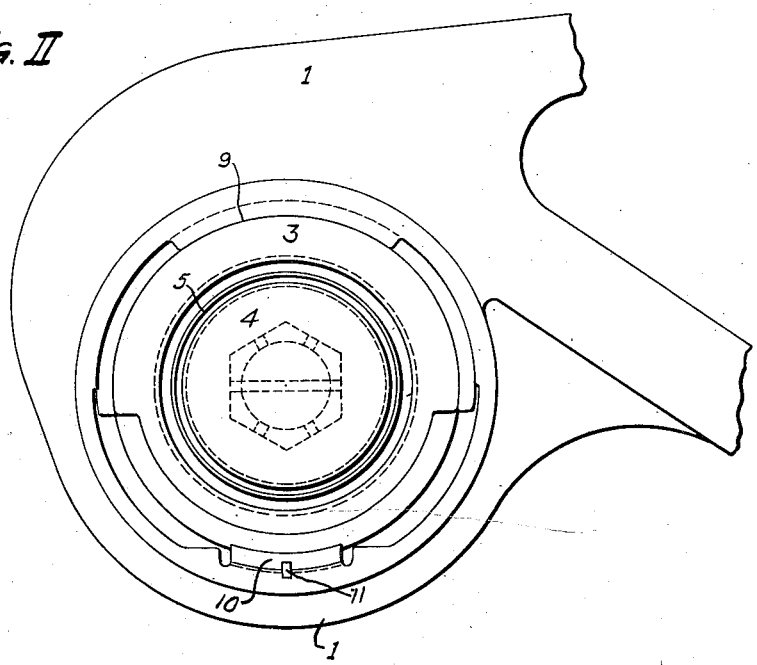
Fig. II
INVENTOR
P. J. McCULLOUGH
BY J. G. Cook
ATTORNEY